United States Patent
Kawakami

(10) Patent No.: US 11,325,832 B2
(45) Date of Patent: May 10, 2022

(54) FIBROUS CARBON NANOSTRUCTURE

(71) Applicant: ZEON CORPORATION, Tokyo (JP)

(72) Inventor: Osamu Kawakami, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 54 days.

(21) Appl. No.: 16/770,618

(22) PCT Filed: Dec. 11, 2018

(86) PCT No.: PCT/JP2018/045455
§ 371 (c)(1),
(2) Date: Jun. 8, 2020

(87) PCT Pub. No.: WO2019/124159
PCT Pub. Date: Jun. 27, 2019

(65) Prior Publication Data
US 2020/0308001 A1    Oct. 1, 2020

(30) Foreign Application Priority Data
Dec. 19, 2017  (JP) .............................. JP2017-243245

(51) Int. Cl.
*B32B 9/00* (2006.01)
*C01B 32/159* (2017.01)
*C01B 32/168* (2017.01)
*D01F 9/12* (2006.01)
*B82Y 30/00* (2011.01)

(52) U.S. Cl.
CPC .......... *C01B 32/159* (2017.08); *C01B 32/168* (2017.08); *D01F 9/12* (2013.01); *B82Y 30/00* (2013.01); *C01B 2202/02* (2013.01); *Y10T 428/30* (2015.01)

(58) Field of Classification Search
CPC ....... Y10T 428/30; B82Y 30/00; B82Y 40/00; B32B 9/007; Y10S 977/742; C01B 32/159; C01B 32/168
USPC ......................................................... 428/408
See application file for complete search history.

(56) References Cited

U.S. PATENT DOCUMENTS

2008/0318049 A1   12/2008   Hata et al.
2015/0018490 A1   1/2015    Takagiwa et al.
2016/0229695 A1   8/2016    Yoshiwara

FOREIGN PATENT DOCUMENTS

WO   2006011655 A1   2/2006
WO   2013133292 A1   9/2013
WO   2015045418 A1   4/2015

OTHER PUBLICATIONS

Jun. 23, 2020, International Preliminary Report on Patentability issued in the International Patent Application No. PCT/JP2018/045455.

*Primary Examiner* — Daniel H Miller
(74) *Attorney, Agent, or Firm* — Kenja IP Law PC

(57) ABSTRACT

Provided is a fibrous carbon nanostructure with which a dispersion liquid having high dispersibility can be obtained without using a dispersant and thus with which a homogeneous film that is free of clumps can be obtained. In temperature programmed desorption of the fibrous carbon nanostructure, carboxyl group-derived carbon dioxide desorption among carbon dioxide desorption at from 25° C. to 1,000° C. is more than 1,200 μmol/g.

3 Claims, No Drawings

FIBROUS CARBON NANOSTRUCTURE

TECHNICAL FIELD

The present disclosure relates to a fibrous carbon nanostructure.

BACKGROUND

Fibrous carbon nanostructures such as carbon nanotubes (hereinafter, also referred to as "CNTs") have been attracting interest in recent years as materials having excellent electrical conductivity, thermal conductivity, and mechanical characteristics.

However, it has been difficult to cause fibrous carbon nanostructures such as CNTs to display the high-level characteristics expected thereof because such fibrous carbon nanostructures readily form bundle structures through Van der Waals forces and the like, and are difficult to disperse in a solvent or resin.

In response, a technique has been proposed for improving dispersibility of fibrous carbon nanostructures such as CNTs by subjecting the fibrous carbon nanostructures to surface modification treatment such as oxidation treatment (for example, refer to Patent Literature (PTL) 1).

CITATION LIST

Patent Literature

PTL 1: WO 2015/045418 A1

SUMMARY

Technical Problem

However, although it is possible to obtain a fibrous carbon nanostructure dispersion liquid using conventional fibrous carbon nanostructures, there is room for improvement in terms of obtaining a dispersion liquid that has further improved dispersibility and obtaining a fibrous carbon nanostructure film that has high homogeneity and is free of clumps.

Accordingly, an objective of the present disclosure is to provide a fibrous carbon nanostructure with which a dispersion liquid having high dispersibility can be obtained without using a dispersant and thus with which a homogeneous film that is free of clumps can be obtained.

Solution to Problem

As a result of diligent studies conducted with the aim of solving the problems set forth above, the inventor found that these problems can be solved through a fibrous carbon nanostructure for which carboxyl group-derived carbon dioxide desorption among carbon dioxide desorption at from 25° C. to 1,000° C. in temperature programmed desorption is more than 1,200 µmol/g, and, in this manner, completed the present disclosure.

The present disclosure aims to advantageously solve the problems set forth above by disclosing a fibrous carbon nanostructure for which carboxyl group-derived carbon dioxide desorption among carbon dioxide desorption at from 25° C. to 1,000° C. in temperature programmed desorption is more than 1,200 µmol/g. When carboxyl group-derived carbon dioxide desorption is more than 1,200 µmol/g in this manner, it is possible to obtain a dispersion liquid having high dispersibility without using a dispersant, and thus it is also possible to obtain a homogeneous film that is free of clumps.

Note that carboxyl group-derived carbon dioxide desorption can be determined using a temperature-desorption curve having three vertices that is obtained through measurement of carbon dioxide desorption at from 25° C. to 1,000° C. by temperature programmed desorption through processing such as resolving three peaks attributed respectively to carboxyl groups, lactone groups, and carboxylic anhydride groups based on the literature (Carbon 1996, Vol. 34, 983; Carbon 1993, Vol. 31, 109; and Carbon 1999, Vol. 37, 1379).

Moreover, in temperature programmed desorption of the presently disclosed fibrous carbon nanostructure, carbon dioxide desorption at from 25° C. to 1,000° C. is preferably not less than 4,000 µmol/g and not more than 10,000 µmol/g. When carbon dioxide desorption at from 25° C. to 1,000° C. in temperature programmed desorption is not less than 4,000 µmol/g and not more than 10,000 µmol/g, it is possible to obtain a dispersion liquid having even higher dispersibility without using a dispersant and also to obtain a more homogeneous film that is free of clumps.

Furthermore, in temperature programmed desorption of the presently disclosed fibrous carbon nanostructure, carbon monoxide desorption at from 25° C. to 1,000° C. is preferably not less than 2,400 µmol/g and not more than 10,000 µmol/g. When carbon monoxide desorption at from 25° C. to 1,000° C. in temperature programmed desorption is not less than 2,400 µmol/g and not more than 10,000 µmol/g, it is possible to obtain a dispersion liquid having even higher dispersibility without using a dispersant and also to obtain a more homogeneous film that is free of clumps.

The presently disclosed fibrous carbon nanostructure preferably comprises a carbon nanotube, and more preferably comprises a single-walled carbon nanotube. This is because a fibrous carbon nanostructure that includes a carbon nanotube, and particularly a fibrous carbon nanostructure that includes a single-walled carbon nanotube, can display particularly good characteristics (for example, electrical conductivity, thermal conductivity, strength, etc.).

Advantageous Effect

According to the present disclosure, it is possible to obtain a fibrous carbon nanostructure with which a dispersion liquid having high dispersibility can be obtained without using a dispersant and thus with which a homogeneous film that is free of clumps can be obtained.

DETAILED DESCRIPTION

The following provides a detailed description of embodiments of the present disclosure.

One or more presently disclosed fibrous carbon nanostructures are, for example, surface-modified fibrous carbon nanostructures that have been subjected to surface modification treatment such as oxidation treatment. Moreover, the presently disclosed fibrous carbon nanostructures can suitably be used, for example, in production of a dispersion liquid having surface-modified fibrous carbon nanostructures dispersed in a dispersion medium.

(Fibrous Carbon Nanostructures)

In temperature programmed desorption of the presently disclosed fibrous carbon nanostructures, carboxyl group-derived carbon dioxide desorption among carbon dioxide desorption at from 25° C. to 1,000° C. is required to be more than 1,200 µmol/g, is preferably 1,250 µmol/g or more, and more preferably 1,300 µmol/g or more from viewpoints of (i) the presence of aggregates straight after production of a dispersion liquid, (ii) formation of aggregates during dispersion liquid storage, and (iii) formation of clumps in a film during film formation, and is preferably 2,000 µmol/g or less, more preferably 1,800 µmol/g or less, and particularly preferably 1,400 µmol/g or less from a viewpoint of exploiting the excellent characteristics displayed as fibrous carbon nanostructures. As a result of carboxyl group-derived carbon dioxide desorption among carbon dioxide desorption at from 25° C. to 1,000° C. in temperature programmed desorption of the presently disclosed fibrous carbon nanostructures being more than 1,200 µmol/g, the presently disclosed fibrous carbon nanostructures make it possible to obtain a dispersion liquid having high dispersibility without using a dispersant and thus make it possible to obtain a homogeneous film that is free of clumps.

The fibrous carbon nanostructures may, without any specific limitations, be circular tube shaped carbon nanostructures such as carbon nanotubes (CNTs) or non-circular tube shaped carbon nanostructures such as carbon nanostructures resulting from a six-membered ring network of carbon being formed in a flattened tube shape, for example.

Note that the presently disclosed fibrous carbon nanostructures may include one of the types of carbon nanostructures described above or may include two or more of the types of carbon nanostructures described above.

Of the types of carbon nanostructures described above, fibrous carbon nanostructures including CNTs are preferable as the fibrous carbon nanostructures. This is because fibrous carbon nanostructures including CNTs can display particularly good characteristics (for example, electrical conductivity, thermal conductivity, strength, etc.).

Note that the fibrous carbon nanostructures including CNTs may be composed of just CNTs or may be a mixture of CNTs and fibrous carbon nanostructures other than CNTs.

Although single-walled carbon nanotubes and/or multi-walled carbon nanotubes can be used as CNTs in the fibrous carbon nanostructures without any specific limitations, carbon nanotubes having from one to five walls are preferable, and single-walled carbon nanotubes are more preferable. This is because carbon nanotubes having fewer walls can display particularly good characteristics.

The presently disclosed fibrous carbon nanostructures are fibrous carbon nanostructures for which carboxyl group-derived carbon dioxide desorption among carbon dioxide desorption at from 25° C. to 1,000° C. in temperature programmed desorption is more than 1,200 µmol/g, and preferably display the following properties (1) and (2).

(1) Carbon dioxide desorption of not less than 4,000 µmol/g and not more than 10,000 µmol/g at from 25° C. to 1,000° C. in temperature programmed desorption (2) Carbon monoxide desorption of not less than 2,400 µmol/g and not more than 10,000 µmol/g at from 25° C. to 1,000° C. in temperature programmed desorption Note that carbon monoxide desorption and carbon dioxide desorption in temperature programmed desorption can be determined for fibrous carbon nanostructures by a publicly known method. Specifically, the fibrous carbon nanostructures are first subjected to heat treatment inside a certain temperature programmed desorption apparatus to cause desorption of adsorbed water from the surfaces of the fibrous carbon nanostructures. Next, the fibrous carbon nanostructures that have been heat treated are heated to a certain temperature in an inert gas such as helium gas, and carbon monoxide and carbon dioxide that evolve in accompaniment to desorption of functional groups (oxygen atom-containing compounds, etc.) from the surfaces of the fibrous carbon nanostructures are each quantified.

Moreover, carboxyl group-derived carbon dioxide desorption can be determined using a temperature-desorption curve having three vertices that is obtained through measurement of carbon dioxide desorption at from 25° C. to 1,000° C. in temperature programmed desorption through processing such as resolving three peaks attributed respectively to carboxyl groups, lactone groups, and carboxylic anhydride groups based on the literature (Carbon 1996, Vol. 34, 983; Carbon 1993, Vol. 31, 109; and Carbon 1999, Vol. 37, 1379).

Furthermore, carbon monoxide (CO) desorption or carbon dioxide ($CO_2$) desorption at from 25° C. to 1,000° C. in temperature programmed desorption is determined as the total amount of CO or the total amount of $CO_2$ that is desorbed during heating of the fibrous carbon nanostructures until the temperature thereof rises to 1,000° C.

The fibrous carbon nanostructures preferably have carbon dioxide ($CO_2$) desorption of not less than 4,000 µmol/g and not more than 10,000 µmol/g at from 25° C. to 1,000° C. in temperature programmed desorption, and preferably have carbon monoxide (CO) desorption of not less than 2,400 µmol/g and not more than 10,000 µmol/g at from 25° C. to 1,000° C. in temperature programmed desorption.

Note that CO and $CO_2$ in gas evolved during temperature programmed desorption are derived from various functional groups that are bonded to the surfaces of the fibrous carbon nanostructures, such as hydroxy groups, carboxyl groups, ketone groups, lactone groups, carboxylic anhydride groups, and aldehyde groups. The fibrous carbon nanostructures have the amounts of CO and $CO_2$ desorption described above and are presumed to have a large number of hydroxy groups and carboxyl groups, in particular, present at the surfaces thereof. The fibrous carbon nanostructures have excellent dispersibility in various solvents, for example, as a result of having the characteristics described above. Furthermore, the fibrous carbon nanostructures have excellent electrical conductivity and are substantially composed of carbon atoms, which means that the fibrous carbon nanostructures have excellent reliability and do not suffer from the degradation that is observed when a metal is included as a constituent component. For these reasons, the fibrous carbon nanostructures are useful as various materials.

Note that from a viewpoint of increasing the usefulness of the fibrous carbon nanostructures, CO desorption of the fibrous carbon nanostructures at from 25° C. to 1,000° C. in temperature programmed desorption is more preferably 3,000 µmol/g or more, and particularly preferably 3,800 µmol/g or more, and is more preferably 8,000 µmol/g or less, particularly preferably 5,000 µmol/g or less, and most preferably 3,900 µmol/g or less.

Moreover, for the same reason, $CO_2$ desorption of the fibrous carbon nanostructures at from 25° C. to 1,000° C. in temperature programmed desorption is more preferably 4,400 µmol/g or more, and particularly preferably 5,900 µmol/g or more, and is more preferably 9,000 µmol/g or less, particularly preferably 8,000 µmol/g or less, and most preferably 6,400 µmol/g or less.

The average diameter (Av) and diameter standard deviation ($\sigma$) of the fibrous carbon nanostructures normally satisfy $0.60>(3\sigma/Av)>0.20$, and preferably satisfy $0.60>(3\sigma/Av)>0.50$ from a viewpoint of obtaining excellent dispersibility. Note that the term "diameter" refers to the external diameter of the fibrous carbon nanostructures. Moreover, the average diameter (Av) and the diameter standard deviation ($\sigma$) are respectively determined as an average value and a standard deviation when the diameters of 100 randomly selected fibrous carbon nanostructures are measured through observation under a transmission electron microscope. (Note that the subsequently described average length is determined as an average value when length is measured by the same method).

The fibrous carbon nanostructures are preferably fibrous carbon nanostructures for which a ratio ($3\sigma/Av$) of a value $3\sigma$ (value obtained by multiplying the diameter standard deviation ($\sigma$: sample standard deviation) by 3) relative to the average diameter (Av) is more than 0.20 and less than 0.60, more preferably fibrous carbon nanostructures for which $3\sigma/Av$ is more than 0.25, and even more preferably fibrous carbon nanostructures for which $3\sigma/Av$ is more than 0.50. Fibrous carbon nanostructures for which $3\sigma/Av$ is more than 0.20 and less than 0.60 can display particularly good characteristics.

The average diameter (Av) and the standard deviation ($\sigma$) of the fibrous carbon nanostructures may be adjusted by changing the production method and the production conditions of the fibrous carbon nanostructures, or may be adjusted by combining a plurality of types of fibrous carbon nanostructures obtained by different production methods.

The fibrous carbon nanostructures may suitably be fibrous carbon nanostructures that take a normal distribution when a plot is made of diameter measured as described above on a horizontal axis and probability density on a vertical axis, and a Gaussian approximation is made.

The average diameter (Av) of the fibrous carbon nanostructures is preferably 0.5 nm or more, more preferably 1 nm or more, and particularly preferably 4 nm or more, and is preferably 60 nm or less, more preferably 30 nm or less, even more preferably 15 nm or less, particularly preferably 10 nm or less, and most preferably 5 nm or less. Fibrous carbon nanostructures having an average diameter (Av) within any of the ranges set forth above can display particularly good characteristics.

The "average diameter of the fibrous carbon nanostructures" referred to in the present disclosure can be determined by measuring the diameters (external diameters) of 20 fibrous carbon nanostructures, for example, in a transmission electron microscope (TEM) image, and then calculating a number-average value of the measured diameters.

The average length of the fibrous carbon nanostructures is normally not less than 10 nm and not more than 800 nm, is preferably 100 nm or more, and is preferably 500 nm or less, and more preferably 300 nm or less.

The carbon purity of the fibrous carbon nanostructures is preferably 98 mass % or more, more preferably 99 mass % or more, and even more preferably 99.9 mass % or more.

The presently disclosed fibrous carbon nanostructures can be produced by, for example, performing surface modification treatment with respect to any fibrous carbon nanostructures (hereinafter, also referred to as "source material carbon nanostructures") for which carboxyl group-derived $CO_2$ desorption among $CO_2$ desorption at from 25° C. to 1,000° C. in temperature programmed desorption is 1,200 μmol/g or less. Moreover, CO and $CO_2$ desorption at from 25° C. to 1,000° C. in temperature programmed desorption can be adjusted by appropriately altering the conditions of surface modification treatment of the fibrous carbon nanostructures.

Publicly known techniques described in WO 2013/133292 A1 and the like can be adopted without any specific limitations in the surface modification treatment. The surface modification treatment can be carried out using a publicly known surface modifying agent such as sulfuric acid, ozone, fluorine gas, or hydrogen peroxide, for example. Of these examples, a surface modifying agent containing sulfuric acid is preferable from a viewpoint of fibrous carbon nanostructure dispersibility. The surface modification treatment conditions can be set in accordance with the type of surface modifying agent that is used and the desired properties of the surface-modified fibrous carbon nanostructures.

The presently disclosed fibrous carbon nanostructures can be well dispersed in a dispersion medium such as water without using a dispersant, for example. Moreover, the resultant fibrous carbon nanostructure dispersion liquid can be used in production of various shaped products (for example, antistatic films, transparent conductive films, etc.).

<Fibrous Carbon Nanostructure Production Method>

Note that fibrous carbon nanostructures having the properties set forth above can be efficiently produced by, in a method in which during synthesis of fibrous carbon nanostructures through CVD by supplying a feedstock compound and a carrier gas onto a substrate having a catalyst layer at the surface thereof, a trace amount of an oxidizing agent (catalyst activating material) is provided in the system to dramatically improve catalytic activity of the catalyst layer (for example, refer to WO 2006/011655 A1), forming the catalyst layer at the surface of the substrate by a wet process and using a feedstock gas containing ethylene (for example, a gas containing more than 10 volume % of ethylene), for example.

Formation of the catalyst layer at the surface of the substrate by a wet process can be carried out by, for example, applying a coating liquid A containing an aluminum compound onto the substrate, drying the coating liquid A to form an aluminum thin film (catalyst-supporting layer supporting iron thin film (catalyst layer)) on the substrate, further applying a coating liquid B containing an iron compound onto the aluminum thin film, and drying the coating liquid B to form an iron thin film (catalyst layer) on the aluminum thin film. Note that the term "aluminum thin film" refers to a thin film containing aluminum as a metal component, whereas the term "iron thin film" refers to a thin film containing iron as a metal component.

The substrate can be a substrate formed by a metal such as iron, nickel, chromium, molybdenum, tungsten, titanium, aluminum, manganese, cobalt, copper, silver, gold, platinum, niobium, tantalum, lead, zinc, gallium, indium, germanium, or antimony, a substrate formed by an alloy or an oxide of any of these metals, a substrate formed by a non-metal such as silicon, quartz, glass, mica, graphite, or diamond, or a substrate formed by a ceramic.

The coating liquid A can be a coating liquid obtained by dissolving or dispersing an organometallic compound or a metal salt that can form an alumina thin film as an aluminum thin film in an organic solvent.

Examples of organometallic compounds that can form an alumina thin film include aluminum alkoxides such as aluminum trimethoxide, aluminum triethoxide, aluminum tri-n-propoxide, aluminum tri-i-propoxide, aluminum tri-n-butoxide, aluminum tri-sec-butoxide, and aluminum tri-tert-butoxide. Other examples of aluminum-containing organometallic compounds include complexes such as tris (acetylacetonato)aluminum(III). Examples of metal salts that can form an alumina thin film include aluminum sulfate, aluminum chloride, aluminum nitrate, aluminum bromide, aluminum iodide, aluminum lactate, basic aluminum chloride, and basic aluminum nitrate. Various organic solvents such as alcohols, glycols, ketones, ethers, esters, and hydrocarbons can be used as the organic solvent. These examples can be used individually or as a mixture.

A stabilizer may be added to the coating liquid A in order to suppress a condensation polymerization reaction of the organometallic compound and the metal salt. The stabilizer is preferably at least one selected from the group consisting of β-diketones and alkanolamines. Examples of β-diketones that can be used include acetylacetone, methyl acetoacetate, ethyl acetoacetate, benzoylacetone, dibenzoylmethane, benzoyltrifluoroacetone, furoylacetone, and trifluoroacetylacetone, with acetylacetone and ethyl acetoacetate being particularly preferable. Examples of alkanolamines that can be used include monoethanolamine, diethanolamine, triethanolamine, N-methyldiethanolamine, N-ethyldiethanolamine, N,N-dimethylaminoethanol, diisopropanolamine, and triisopropanolamine, with a secondary or tertiary alkanolamine being preferable.

The coating liquid B can be a coating liquid obtained by dissolving or dispersing an organometallic compound or a metal salt that can form an iron thin film in an organic solvent.

Examples of organometallic compounds that can form an iron thin film include iron pentacarbonyl, ferrocene, iron(II) acetylacetonate, iron(III) acetylacetonate, iron(II) trifluoroacetylacetonate, and iron(III) trifluoroacetylacetonate. Examples of metal salts that can form an iron thin film include inorganic acid iron salts such as iron sulfate, iron nitrate, iron phosphate, iron chloride, and iron bromide, and organic acid iron salts such as iron acetate, iron oxalate, iron citrate, and iron lactate. These examples can be used individually or as a mixture.

The organic solvent contained in the coating liquid B is not specifically limited and can be any of the same organic solvents as can be used in the previously described coating liquid A. Moreover, the coating liquid B may contain any of the same stabilizers as can be used in the previously described coating liquid A.

Application and drying of the coating liquids A and B described above can be performed by known techniques.

EXAMPLES

The following provides a more specific description of the present disclosure based on examples. However, the present disclosure is not limited to the following examples. In the following description, "%" used to express quantities is by mass, unless otherwise specified.

In the examples and comparative examples, "evaluation by temperature programmed desorption", "evaluation of dispersibility in a dispersion liquid", "confirmation of the presence of aggregates in a dispersion liquid", and "confirmation of the presence of clumps in a film" were performed through measurement or evaluation by the following methods.

(Evaluation by Temperature Programmed Desorption)

"Acid-treated carbon nanotubes" obtained in each example or comparative example were set in a thermal desorption gas mass spectrometer (produced by Shimadzu Corporation; product name: QP2010 Ultra; heating from room temperature (25° C.) to 1,000° C. at a heating rate of 10° C./min in a helium atmosphere), desorbed $CO_2$ and CO were detected by a mass spectrometer, the amounts (μmol) of evolved gases per 1 g of the "acid-treated carbon nanotubes" were calculated from the determined amounts of CO gas and $CO_2$ gas, and thus the amounts of CO desorption and $CO_2$ desorption were determined.

In addition, carboxyl group-derived $CO_2$ desorption was measured through such as peak resolving based on the desorption temperature of carboxyl group-derived $CO_2$ in publicly known literature (Carbon 1996, Vol. 34, 983; Carbon 1993, Vol. 31, 109; and Carbon 1999, Vol. 37, 1379).

(Evaluation of Dispersibility in Dispersion Liquid)

A "dispersion liquid of carbon nanotubes" obtained in each example or comparative example was subjected to three cycles of centrifugal separation for 40 minutes at 20,000 G and collection of supernatant using a centrifuge (produced by Beckman Coulter Inc.; product name: OPTIMA XL100K) to obtain 20 mL of a dispersion liquid of carbon nanotubes that had undergone centrifugal separation.

In addition, a spectrophotometer (produced by JASCO Corporation; product name: V670) was used to measure light absorbance Ab1 (optical path length: 1 cm; wavelength: 550 nm) of the dispersion liquid prior to treatment in the centrifuge and light absorbance Ab2 (optical path length: 1 cm; wavelength: 550 nm) of the dispersion liquid after treatment in the centrifuge. Dispersibility of the carbon nanotubes was evaluated by calculating the rate of decrease in light absorbance of the dispersion liquid due to centrifugal separation by the following formula. A smaller rate of decrease in light absorbance indicates that the carbon nanotubes have been well surface modified and that dispersibility of the carbon nanotubes is excellent.

$$\text{Rate of light absorbance decrease (\%)} = \{1-(Ab2/Ab1)\} \times 100$$

(Confirmation of Presence of Aggregates in Dispersion Liquid)

After measuring 3.0 g of a "liquid of treated carbon nanotubes and acid" obtained in each example or comparative example into a 50 mL sample bottle, the liquid was diluted through addition of 27.0 g of deionized water. Supernatant was removed and then the liquid volume was adjusted to 30 mL through addition of deionized water. The pH was adjusted to 7.0 through addition of ammonia water of 0.1 mass % in concentration and then an ultrasonic irradiation apparatus (produced by Branson; product name: BRANSON 5510) was used to perform ultrasonic irradiation for 50 minutes at 42 Hz to obtain a "dispersion liquid of carbon nanotubes". Dispersibility was evaluated by eye according to the following standard.

[Evaluation Standard]
Good: Aggregates visible by eye not present
Poor: Aggregates visible by eye present (Confirmation of Presence of Clumps in Film)

A "dispersion liquid of carbon nanotubes" obtained in each example or comparative example was applied onto a glass base plate by a #2 bar coater and was then dried at 130° C. for 10 minutes to form a carbon nanotube film on the glass base plate.

The obtained carbon nanotube film was observed using an optical microscope (×100 magnification) to confirm whether or not visible clumps (30 μm or more in diameter) of carbon nanotubes were present in the field of view of the microscope. The carbon nanotube film was evaluated according to the following standard. The absence of clumps of carbon nanotubes indicates that the carbon nanotubes have been well surface modified and that dispersibility of the carbon nanotubes is excellent.

[Evaluation Standard]
Good: Clumps not present
Poor: Clumps present

Example 1

<Production of Dispersion Liquid of Carbon Nanotubes>

A 300 mL flask including a condenser and an impeller was charged with 0.80 g of carbon nanotubes (produced by Zeon Nanotechnology Co., Ltd.; product name: ZEONANO SG101; average diameter: 4.3 nm; average length: 360 μm) as fibrous carbon nanostructures and 83 mL of sulfuric acid (produced by Wako Pure Chemical Industries, Ltd.; concentration: 96% to 98%), and was heated under stirring at an internal temperature of 260° C. for 24.0 hours.

Next, 10 g of a "liquid of treated carbon nanotubes and sulfuric acid" obtained through 24.0 hours of heat treatment in sulfuric acid was filtered using a PTFE membrane filter. Solid matter was washed with deionized water and was then dried at 150° C. in a vacuum for 15 hours to obtain 55 mg of "treated carbon nanotubes" (average diameter: 4.3 nm; average length: 122 nm).

Example 2

"Treated carbon nanotubes" (average diameter: 4.3 nm; average length: 268 nm) were obtained in the same way as in Example 1 with the exception that in Example 1, the duration of heat treatment in sulfuric acid was set as 20.0 hours instead of 24.0 hours.

Comparative Example 1

"Treated carbon nanotubes" (average diameter: 4.3 nm; average length: 1 μm) were obtained in the same way as in Example 1 with the exception that in Example 1, the duration of heat treatment in sulfuric acid was set as 12.0 hours instead of 24.0 hours.

Comparative Example 2

"Treated carbon nanotubes" (average diameter: 4.3 nm; average length: 210 μm) were obtained in the same way as in Example 1 with the exception that in Example 1, the temperature and duration of heat treatment in sulfuric acid were respectively set as 180° C. and 24.0 hours instead of 260° C. and 24.0 hours.

Comparative Example 3

<Production of Dispersion Liquid of Carbon Nanotubes>

A 300 mL flask including a condenser and an impeller was charged with 0.80 g of carbon nanotubes (produced by Zeon Nanotechnology Co., Ltd.; product name: ZEONANO SG101; average diameter: 4.3 nm; average length: 360 μm) as fibrous carbon nanostructures and 64 mL of sulfuric acid (produced by Wako Pure Chemical Industries, Ltd.; concentration: 96% to 98%), and was heated under stirring at an internal temperature of 130° C. for 6.0 hours.

Next, 10 g of a "liquid of treated carbon nanotubes and sulfuric acid" obtained through 6.0 hours of heat treatment in sulfuric acid was filtered using a PTFE membrane filter. Solid matter was washed with deionized water and was then dried at 150° C. in a vacuum for 15 hours to obtain 48 mg of "treated carbon nanotubes" (average diameter: 4.3 nm; average length: 118 μm).

TABLE 1

|  | CO desorption (μmol/g) (25° C. to 1,000° C.) | $CO_2$ desorption (μmol/g) (25° C. to 1,000° C.) | Carboxyl group-derived $CO_2$ desorption (μmol/g) | Rate of light absorbance decrease (%) | Aggregates in dispersion liquid | Clumps in film |
|---|---|---|---|---|---|---|
| Example 1 | 3800 | 5900 | 1400 | 31 | Good | Good |
| Example 2 | 3900 | 6400 | 1300 | 46 | Good | Good |
| Comparative Example 1 | 3600 | 6000 | 1200 | 55 | Good | Poor |
| Comparative Example 2 | 450 | 840 | 180 | 96 | Poor | Poor |
| Comparative Example 3 | 3200 | 1000 | 210 | 78 | Good | Poor |

It can be seen from Table 1 that the fibrous carbon nanostructures of Examples 1 and 2 had excellent dispersibility in a dispersion liquid and provided a homogeneous film that was free of clumps in the film compared to the fibrous carbon nanostructures of Comparative Example 2, and also that the fibrous carbon nanostructures of Examples 1 and 2 provided a homogeneous film that was free of clumps in the film compared to the fibrous carbon nanostructures of Comparative Examples 1 to 3.

INDUSTRIAL APPLICABILITY

The presently disclosed fibrous carbon nanostructure can suitably be used, for example, as a constituent material of a conductive layer (transparent conductive film), an antistatic film, or a catalyst layer of an electrode used in an electronic component or an electronic device such as a touch panel, a solar cell, or a fuel cell.

The invention claimed is:

1. A fibrous carbon nanostructure, wherein
carbon dioxide desorption of the fibrous carbon nanostructure at from 25° C. to 1,000° C. in temperature programmed desorption is 5,900 μmol/g or more and 6,400 μmol/g or less,
carboxyl group-derived carbon dioxide desorption among the carbon dioxide desorption of the fibrous carbon nanostructure at from 25° C. to 1,000° C. in temperature programmed desorption is 1,300 μmol/g or more and 1,400 μmol/g or less, and
carbon monoxide desorption of the fibrous carbon nanostructure at from 25° C. to 1,000° C. in temperature programmed desorption is 3,800 μmol/g or more and 3,900 μmol/g or less.

2. The fibrous carbon nanostructure according to claim 1, wherein the fibrous carbon nanostructure comprises a carbon nanotube.

3. The fibrous carbon nanostructure according to claim 2, wherein the carbon nanotube is a single-walled carbon nanotube.

* * * * *